United States Patent
Kennedy (12) 
(10) Patent No.: US 6,193,258 B1
(45) Date of Patent: *Feb. 27, 2001

(54) SWIVELING TRAILER HITCH ALIGNMENT AND LIFTING DEVICE WITH MULTIPLE PIVOTING POINTS

(75) Inventor: Steven D. Kennedy, Boise, ID (US)

(73) Assignee: Charles F. and Shirley Lee Leonard, Starr, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/191,654

(22) Filed: Nov. 13, 1998

Related U.S. Application Data (63) Continuation-in-part of application No. 08/914,241, filed on Aug. 18, 1997, now Pat. No. 5,882,029.

(51) Int. Cl.$^7$ .......................................................... B60D 1/06

(52) U.S. Cl. .......................................... 280/477; 280/511

(58) Field of Search .................................. 280/477, 511; 254/325, 334, 274, 276

(56) References Cited

U.S. PATENT DOCUMENTS

| | | | |
|---|---|---|---|
| 3,201,144 | 8/1965 | Smyser | 280/477 |
| 3,767,230 | 10/1973 | DeVries | 280/477 |
| 3,938,122 | 2/1976 | Mangus | 280/477 |
| 4,173,353 | 11/1979 | Steele | 280/477 |
| 4,186,938 | 2/1980 | Youngblood | 280/402 |
| 4,903,978 | 2/1990 | Schrum | 280/477 |
| 5,005,852 | 4/1991 | Smyly | 280/477 |
| 5,009,445 | 4/1991 | Williams, Jr. | 280/477 |
| 5,080,386 | 1/1992 | Lazar | 280/477 |
| 5,085,408 | 2/1992 | Norton et al. | 254/325 |
| 5,314,202 | 5/1994 | Wilkins | 280/511 |
| 5,405,160 | 4/1995 | Weaver | 280/477 |
| 5,516,139 | * 5/1996 | Woods | 280/477 |
| 5,882,029 | * 3/1999 | Kennedy | 280/477 |

FOREIGN PATENT DOCUMENTS

| | | | |
|---|---|---|---|
| 872433 | 2/1953 | (DE) | 280/477 |
| 477180 | 8/1936 | (GB) . | |
| PCT/GB90/00383 | 3/1909 | (WO) . | |

* cited by examiner

*Primary Examiner*—J. J. Swann
*Assistant Examiner*—Michael Cuff
(74) *Attorney, Agent, or Firm*—Ken J. Pedersen; Barbara S. Pedersen (57) ABSTRACT

The present invention is a device for aligning the trailer hitch ball on the towing vehicle, and for lifting the trailer hitch on and off the ball. The device comprises a swiveling vertical post assembly in close proximity to the hitch ball. The swiveling vertical post assembly pivots at its attachment point with the towing vehicle, thereby allowing the user to load or unload a trailer from the vehicle even when the trailer is not perfectly aligned directly behind the vehicle. The swiveling vertical post assembly has a pivotal arm which can be moved from an upper pivot point position to a lower pivot point position. In both the upper position and the lower position, the pivotal arm is allowed to rotate from a generally vertical position to a rearwardly inclined position in order to provide a moving cable guide that helps determine the location and direction of movement of the cable and hence the forces exerted on the tongue end. The stationary post has a lower cable receiver for receiving a cable connected to a winch on the tongue of the trailer. Once the cable is anchored to the receiver, operation of the winch creates forces which move the tongue and socket relative to the hitch ball and also pivot the pivoting arm to redirect the direction of the cable and, hence, the socket. The invention has two (2) modes of operation: 1) on-loading the trailer hitch onto the ball; and, 2) off-loading the trailer hitch from the ball. Each of these two (2) modes of operation have two further modes of operation: (a) when the vehicle is at a higher elevation than the trailer; and (b) when the trailer is at a higher elevation than the vehicle.

10 Claims, 14 Drawing Sheets

SWIVELING TRAILER HITCH ALIGNMENT AND LIFTING DEVICE WITH MULTIPLE PIVOTING POINTS

The application is a continuation-in-part application of, and claims priority from, U.S. patent application Ser. No. 08/914,241, filed Aug. 18, 1997, entitled "Trailer Hitch Alignment and Lifting Device," and issued as U.S. Pat. No. 5,882,029 on Mar. 16, 1999, the disclosure of which is incorporated herein by this reference.

BACKGROUND OF THE INVENTION

1. Field of the Invention

This invention relates generally to hitches for trailers, wagons and other towed vehicles. More specifically, this invention relates to an apparatus for, and method of, easily and quickly aligning the tongue and hitch first portion on the trailer ("coupler" or "socket") with the receiver and hitch second portion, usually a ball on a post ("ball"), on the towing vehicle, and for lifting the trailer hitch on and off the ball.

2. Related Art

U.S. Pat. No. 5,009,445 (Williams, Jr.) discloses a trailer hitch with a winch and cable which passes around a pulley located below the tongue. The cable is provided with a hook which is connected to a ball mount.

U.S. Pat. No. 5,080,386 (Lazar) discloses a self-aligning and self-connecting ball and socket hitch. The hitch ball has a housing with rearwardly diverging walls which guide the tongue on the towed vehicle to align the tongue with the ball. Also, a vertically inclined slide plate engaging the hitch ball lifts the tongue up and over the ball.

U.S. Pat. No. 5,085,408 (Norton, et al.) discloses a trailer connecting guide which comprises a winch, a winch cable guide, and a pulley on the trailer tongue. In operation, the winch cable is connected to the towing vehicle near the ball post, passed around the pulley, and through the cable guide.

U.S. Pat. No. 5,405,160 (Weaver) discloses a trailer hitch with a winch and a multi-position arm pivotally attached to the underside of the tongue of the trailer forward of the winch. In operation, the arm is locked into a downwardly extending position, and the winch strap passes over it to lift the tongue over the ball.

British Patent No. 477,180 (Scamell, et al.) discloses an improved towing hook for vehicles wherein a winch cable passes between a set of rollers above and forward of a pivotal hook hitch on the towing vehicle.

PCT Published Application No. WO 90/10550 (Suitor) discloses a trailer tongue with a mounting plate carrying a winch. The winch is located beneath a socket hitch which has a downwardly extending cable guide through which the cable passes when it is connected to the ball post.

Still, there is a need in the trailer hitch industry for a safe, effective and durable hitch alignment and lifting device. This invention addresses that need.

SUMMARY OF THE INVENTION

The present invention is a device for aligning the trailer tongue and hitch first portion ("coupler" or "socket") with the receiver and hitch second portion ("ball") on the towing vehicle, and for lifting the coupler on and off the ball. The invented device comprises a vertical member near a hitch ball and a pivotal arm that pivots vertically from a rearwardly inclined angle to a generally upright or somewhat forward angle. In the present invention, the arm is moveable to at least two different pivoting regions, a lower region and an upper region, for advantageously positioning the arm for loading and unloading, respectively.

The device comprises a generally "U-shaped," swiveling vertical post assembly on or connected to the towing vehicle surrounding and in close proximity to the ball. The swiveling vertical post assembly swivels at a vertical axis at its attachment point with the towing vehicle, thereby allowing the user to load or unload a trailer from the vehicle when the trailer is not perfectly aligned directly behind the vehicle.

The swiveling vertical post assembly has a pivotal arm which can be moved from an upper position to a lower position. In both the upper position and the lower position, the pivotal arm is allowed to rotate from a generally vertical position to a rearwardly inclined position.

The swiveling vertical post assembly also has a stationary post extending between the upper front portions of the swiveling vertical post assembly. This stationary post has a lower cable receiver at or near its bottom surface. The lower cable receiver is for receiving a cable connected to a winch on the tongue of the trailer. The tongue of the trailer has a cable guide in front of the winch near the front end of the tongue.

The invention has two (2) modes of operation: 1) on-loading the coupler onto the ball; and 2) off-loading the coupler from the ball. Each of these two modes of operation has two further modes of operation: (a) when the vehicle is at a higher elevation than the trailer; and (b) when the trailer is at a higher elevation than the vehicle.

On-Loading.

During on-loading, in the first mode, where the vehicle is at a higher elevation than the trailer, slack cable from the winch is directed through the tongue cable guide, over the pivotal arm, over the stationary post and connected to the lower cable receiver. However, in the second mode, where the trailer is at a higher elevation than the vehicle, the slack cable from the winch is directed in like manner to the first mode, but under the stationary post for connection to the lower cable receiver. By running the cable in this manner, when the slack is taken out of the cable, the pivotal arm experiences a small, yet sufficient, amount of resistance, thereby keeping the pivotal arm from dropping hard onto the stationary post due to the effect of gravity.

For both modes, when slack is taken out of the cable by operating the winch, the tongue and coupler are pulled up to contact the pivotal arm, thereby causing the pivotal arm to be pulled up to a generally vertical position within the swiveling vertical post. The coupler is then directly above the ball, and when some slack is let back into the cable, the coupler settles down on top of the ball.

Off-Loading.

During off-loading, in the first mode, where the vehicle is at a higher elevation than the trailer, slack cable from the winch is directed through the tongue cable guide, over the pivotal arm, over the stationary post and connected to the lower cable receiver. However, in the second mode where the trailer is at a higher elevation than the vehicle, the slack cable from the winch is in like manner to the first mode, but under the stationary post and connected to the lower cable receiver. By running the cable in this manner, when the slack is taken out of the cable the pivotal arm experiences a small, yet sufficient amount of resistance, thereby keeping the pivotal arm from dropping hard onto the stationary post due to the effect of gravity.

When slack is taken out of the cable by operating the winch, the tongue and coupler are pulled up off the ball, and the pivotal arm is allowed to rotate rearwardly. Then, when some slack is let into the cable, the pivotal arm rotates further rearwardly, and tongue and coupler are allowed to settle down behind the ball.

BRIEF DESCRIPTION OF THE DRAWINGS

FIGS. 8, 9A, 10 & 11 are side schematic sequential views of the embodiment of FIG. 1, during the off-loading mode of operation.

DESCRIPTION OF THE PREFERRED EMBODIMENTS

Referring to the Figures, there is depicted generally one, but not the only, embodiment of the invented swiveling trailer hitch alignment and lifting device 10. In this description and application, directions are indicated relative to the towing vehicle, that is, the terms "rearwardly," "rearward," and "rear" mean towards the trailer, and "forwardly," "forward," and "front" mean towards the vehicle. In FIGS. 1 & 3–11, "rearwardly" would be to the right of the diagram, and "forwardly" would be to the left of the diagram.

Figure 1:
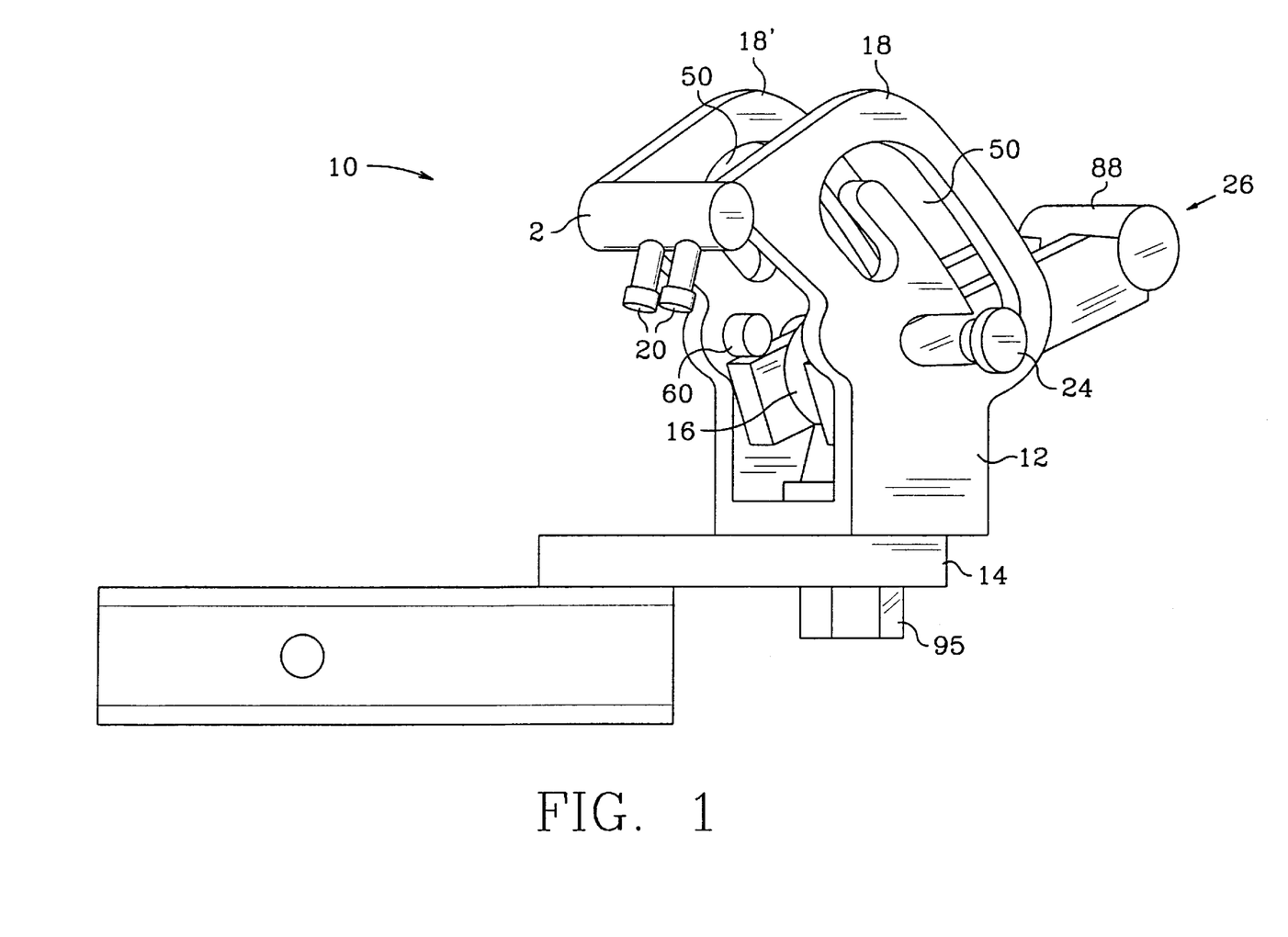
FIG. 1 is a side perspective view of the preferred embodiment of the present invention, a swiveling trailer hitch alignment and lifting device.

The invented device 10, as shown in FIG. 1, is an apparatus for aligning the tongue and hitch first portion ("coupler") on the trailer with the receiver and hitch second portion ("ball") on the towing vehicle, and for lifting the coupler on and off the ball. The apparatus comprises a swiveling vertical post 12 on or connected to the towing vehicle surrounding and in close proximity to the ball. Such swiveling allows the vertical post 12 to swivel on a vertical axis.

Figure 2:
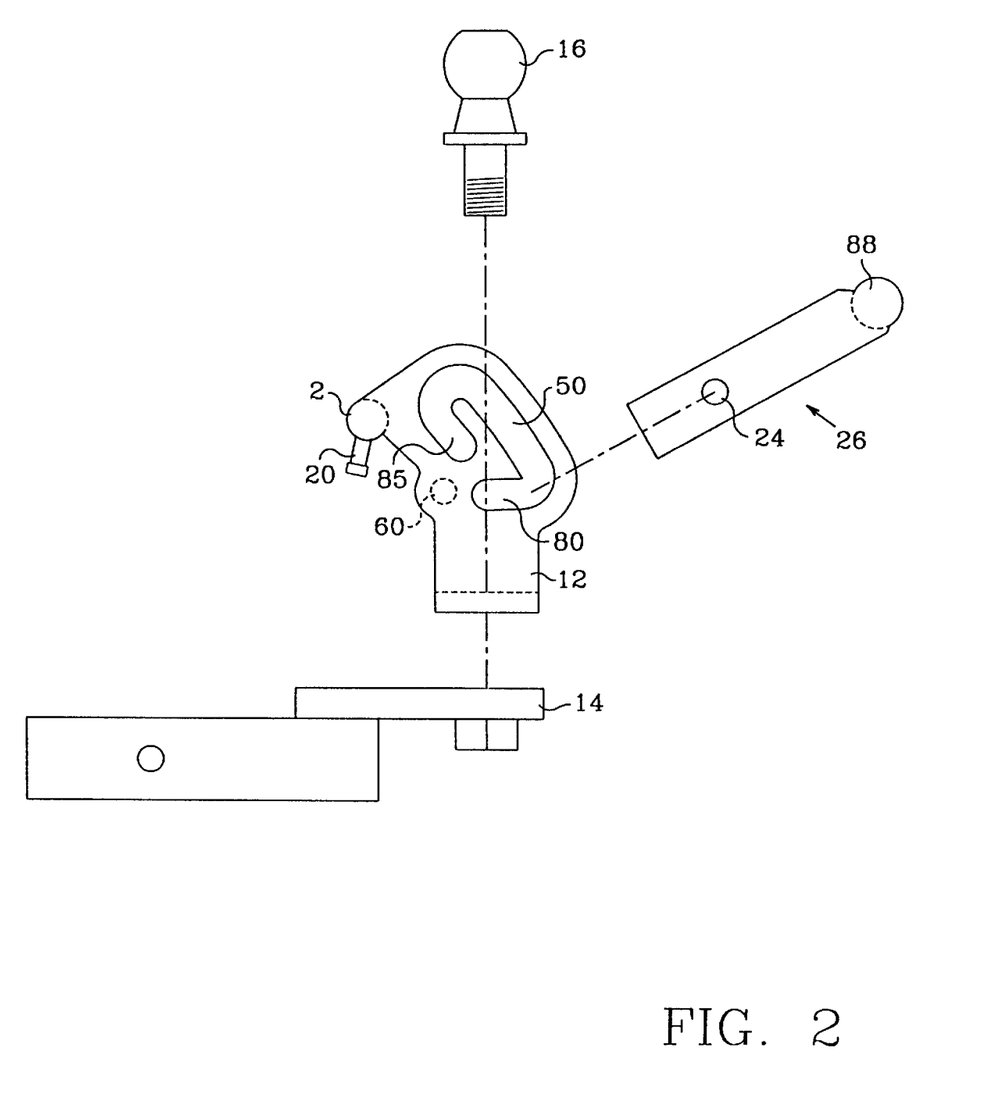
FIG. 2 is an exploded, side schematic view of the embodiment of FIG. 1.
Figure 3:
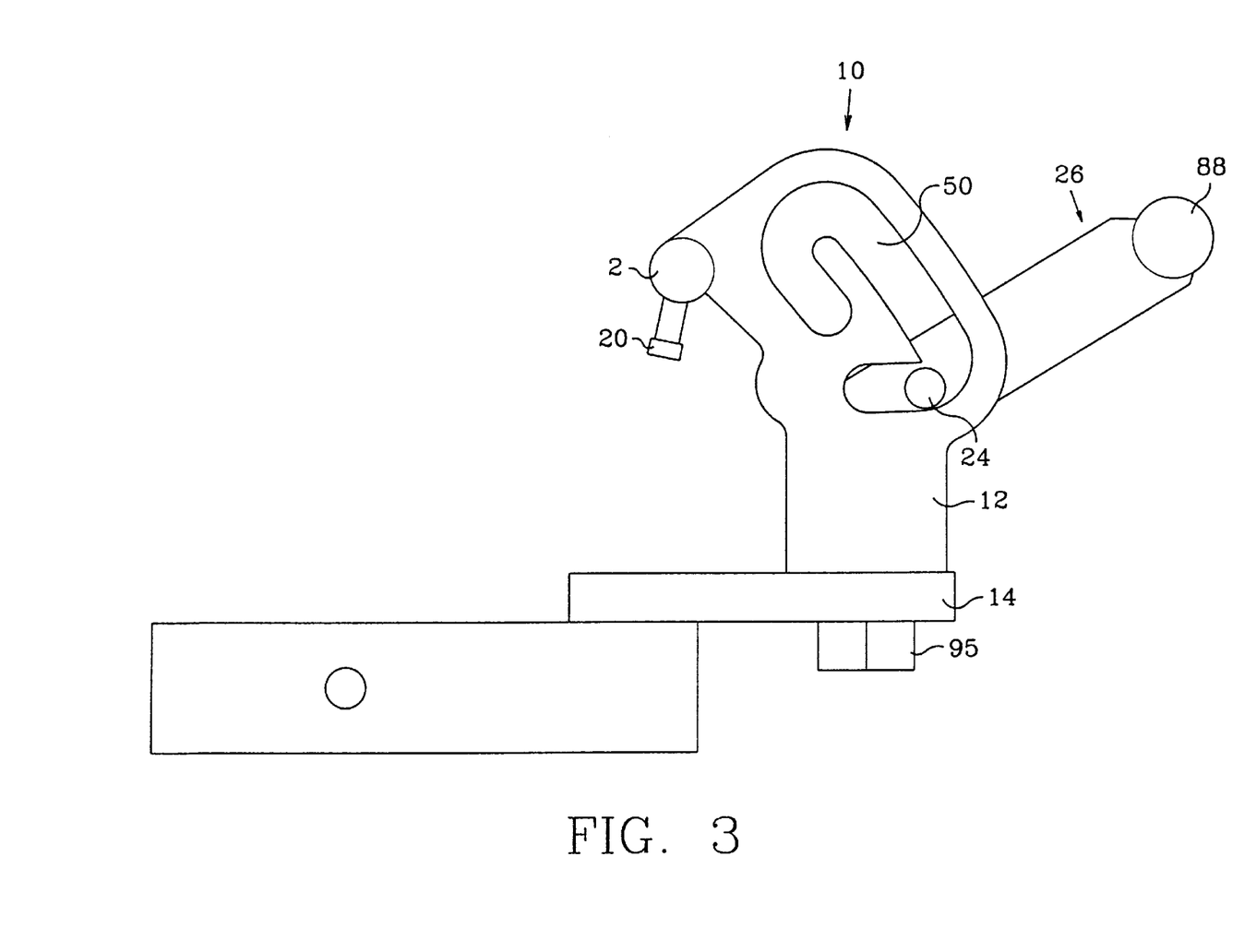
FIG. 3 is a side schematic view of the preferred embodiment shown in FIG. 1.

This swiveling feature allows the user to connect a trailer to the vehicle even when the trailer is not located directly behind the vehicle, a problem with many other trailer hitches. Such a use entails the turning of the swiveling vertical post 12 in an angle so as to align the swiveling vertical post 12 with the trailer hitch. The invented hitch is then operated so as to receive and connect to the hitch ball 16. Preferably, swiveling vertical post 12 is on a ball hitch plate 14 about two inches in front of hitch ball 16 when the ball is two inches in diameter. The swiveling vertical post 12 may be permanently affixed to the ball hitch plate 14, or it may be temporarily attached, as shown in FIG. 2, with a bolt 95, for example, so that it may be easily removed when not in use. This way, when the swiveling vertical post 12 is removed, as shown in FIG. 3, it will not interfere with, for example, the tailgate when the towing vehicle is a pick-up truck. The swiveling vertical post 12 is allowed to pivot at its attachment with the ball hitch plate 14.

Preferably, the swiveling vertical post 12 comprises two (2) sturdy, spaced-apart, parallel, generally vertical upstanding plates 18 and 18' welded at their bottoms to the ball hitch plate 14, forming a U-shape and having between them along their length: a stationary post 2, a lower cable receiver 20, and a pivotal arm 26. However, the swiveling vertical post 12 could also be made from a one-piece plate.

The swiveling vertical post 12 also has a stationary post 2 extending horizontally between plates 18 and 18' at or near the center of the front of the swiveling vertical post 12. The stationary post 2 is a sturdy steel rod, and is located to effectively direct the angle of forces in the cable during the on-loading and off-loading operation. Thus, the stationary post 2 serves as a cable guide for the cable.

On the lower front surface 28 of the stationary post 2 is a lower cable receiver 20. The lower cable receiver 20 is preferably a pair of sturdy steel rods, and is located to effectively receive and secure a hook or knot on the end of the cable from the winch during operation of the invention. The lower cable receiver 20 may also be located on the front top of the ball hitch plate 14, or even on the towed vehicle, as long as its location permits proper interaction with the swiveling vertical post 12 and the stationary post 2 during on-loading and off-loading.

Each of the two plates 18, 18' of the swiveling vertical post 12 have a generally "C-shaped" channel 50 which receives and cooperates with the pivotal arm 26. These channels face forward, meaning that the upper terminus and the lower terminus of the "C" are located to the forward end of the invented swiveling trailer hitch alignment and lifting device 10. The channels 50 allow movement of the pivotal arm 26 to the lower position 80, as shown in FIG. 2, and to the upper position 85, as shown in FIG. 2.

The pivotal arm 26 is an inverted "U-shaped" piece. In the preferred embodiment, this "U-shape" is achieved through the use of a pair of parallel, flat, steel bars or plates, each affixed near their first (distal) ends to the opposite ends of a pivotal arm transverse post 88 and extending perpendicularly from the transverse post 88. This pivotal arm transverse post 88 comprises a steel rod. The distal surface of this transverse post 88 serves as a cable guide. A pair of pivot bolts 24 are affixed to and extend from the exterior surface of the second (proximal) ends of the flat steel bars. The pivot bolts 24 are to be pivotally received in the channels 50 of the plates 18, 18' of the vertical post 12 to permit the rotation of pivotal arm 26 from a generally vertical position to a rearwardly inclined position.

The swiveling vertical post 12 also has a pair of internally located stop pins 60. These stop pins 60 are located adjacent to the front of the bottom of the generally "C-shaped" channel 50. These stop pins 60 serve to stop the forward movement of the pivotal arm 26.

The pivot bolts 24 cooperate with the generally "C-shaped" channel 50. The pivotal arm 26 pivots at pivot bolts 24 from a generally vertical position where its limit is the stationary post 2, to a rearwardly inclined position where the lower ends of the pivotal arm 26 contact and are stopped by the stop pins 60 and actually serves as a fulcrum against which the pivotal arm 26 pivots during unloading, as showing in FIG. 10.

During use, the invention has two (2) modes of operation: 1) on-loading, and 2) off-loading. Each of these two (2) modes of operation have two further modes of operation: (a) when the vehicle is at a higher elevation than the trailer; and (b) when the trailer is at a higher elevation than the vehicle. During all modes, a winch 36 and cable 34 are used to actuate movement of the tongue and coupler relative to the device. Cable 34 may be a metal cable or chain, or fiber rope or strap, or any elongated member on its free end, cable 34 may have a knot 42, a hook, or other attachment means. Winch 36 may be manually or motor driven. Winch 36 is for taking out and letting in slack in cable 34 during operation of the invention. Tongue 38 is connected to the trailer or other towed vehicle.

During on-loading, the cable 34 from winch 36 on tongue 38 is directed through tongue cable guide 40 and then through the device as described above. The knot 42, or other attachment means, is secured to lower cable receiver 20 on the swiveling vertical post 12 during operation of the invention. Tongue cable guide 40 is in front of winch 36 near the front end of the tongue 38. Tongue cable guide 40 is for directing the angle of forces in cable 34 during the on-loading and off-loading operations. Cable guide 40 may be the single ring described in the drawings or a long tube attached to tongue 38 or even attached to the top of socket 44. Preferably, tongue cable guide 40 is in close proximity to trailer hitch socket 44. This way, as tongue cable guide 40 directs the forces during operation of the invention, its location close to trailer hitch socket 44 controls the movement of socket 44 on and off the hitch ball 16.

Figure 4A:
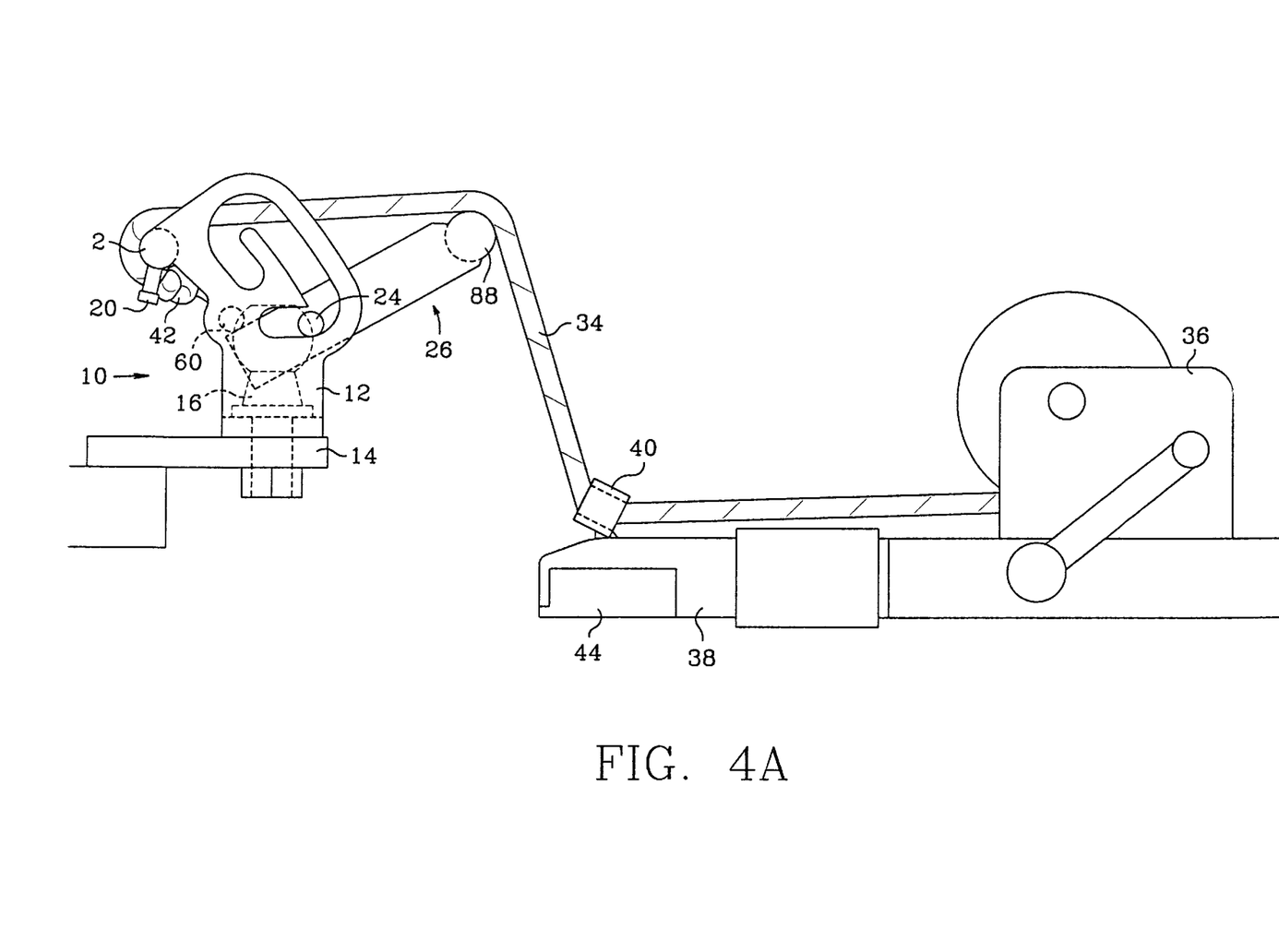
FIGS. 4A, 5, 6, & 7A are side schematic sequential views of the embodiment of FIG. 1, during the on-loading mode of operation.
Figure 4B:
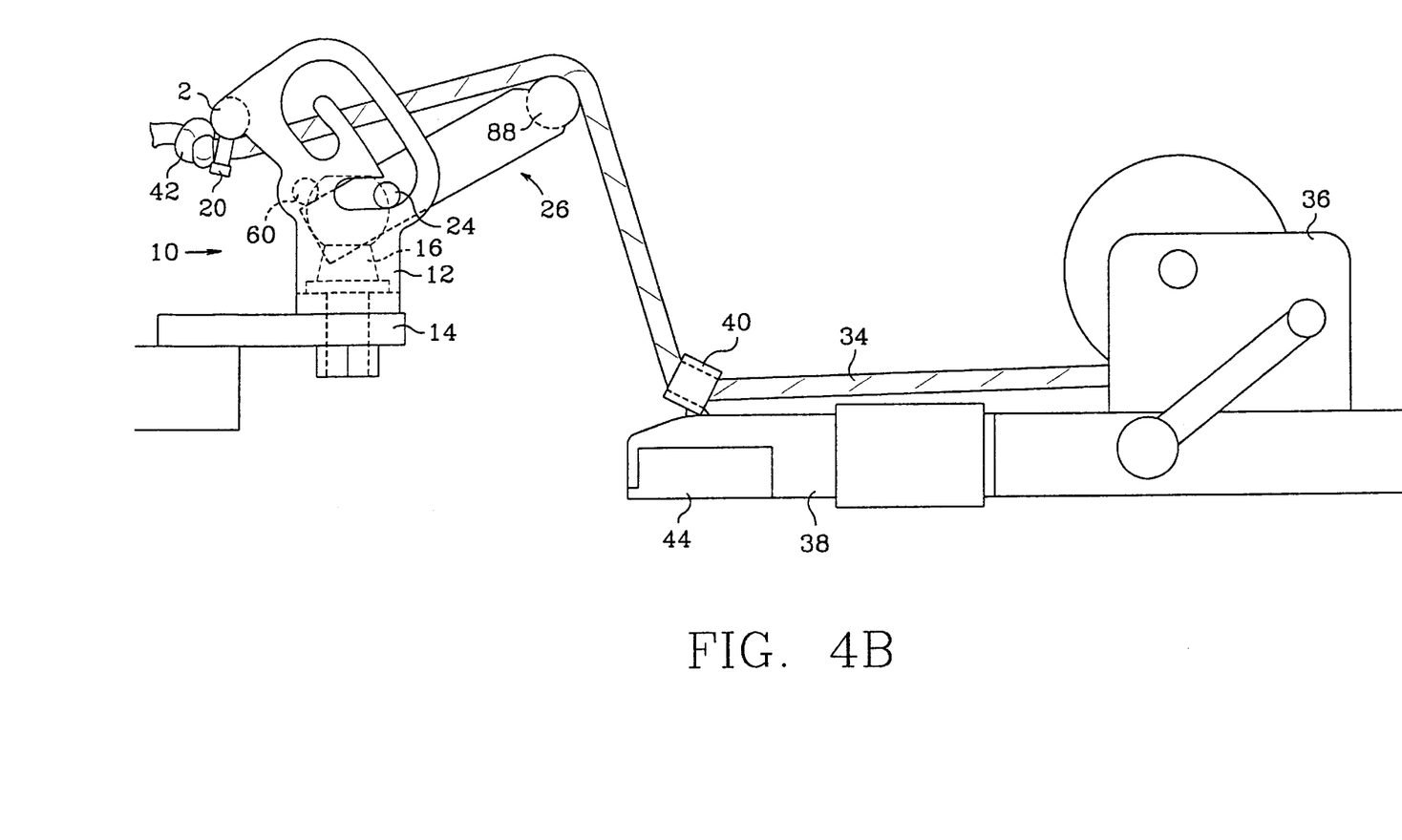
FIG. 4B and FIG. 7B illustrate the alternative cable position for cases where the trailer is higher than the vehicle.

During on-loading, the pivotal arm 26 is placed in its lower position, which includes the portion in and near the lower position 80 of the channel 50. Placing the pivotal arm 26 in its lower position 80 entails maneuvering the pivotal arm 26 so that the pivot bolts 24 are located within the lower portion 80 of the "C-shaped" channels, that is, the lower generally horizontal portion. The pivotal arm 26 is then rotated to the rearward position. When the vehicle is at a higher elevation than the trailer, the cable 34 from tongue cable guide 40 is directed over the pivotal arm 26, over the stationary post 2 and is connected to the lower cable receiver 20 as show in FIG. 4A. When the trailer is at a higher elevation than the vehicle, the cable 34 from the tongue cable guide 40 is directed over the pivotal arm 26, and under the stationary post 2 and is connected to the lower cable receiver 20, as shown in FIG. 4-B.

Figure 5:
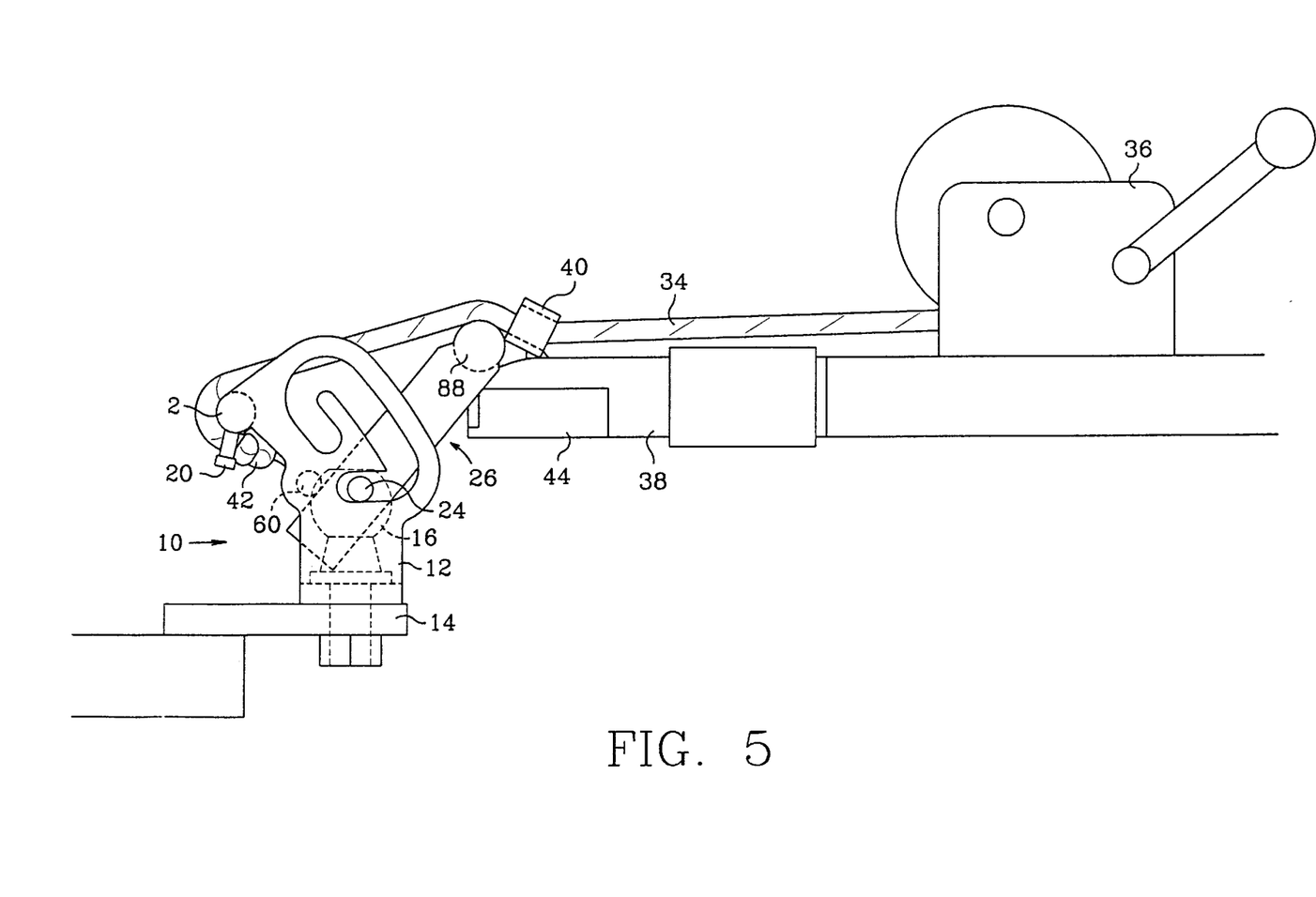
Figure 6:
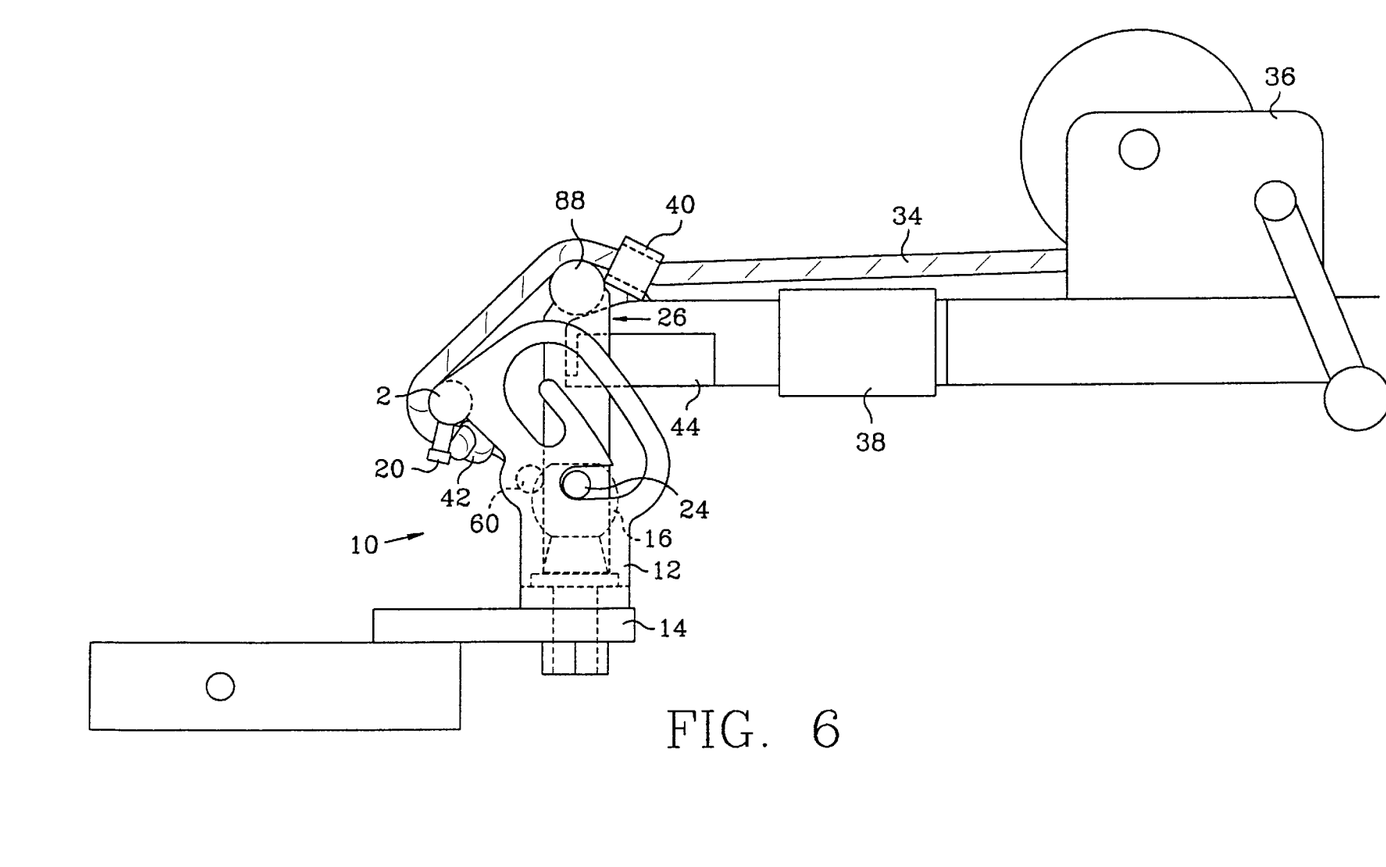
Figure 7A:
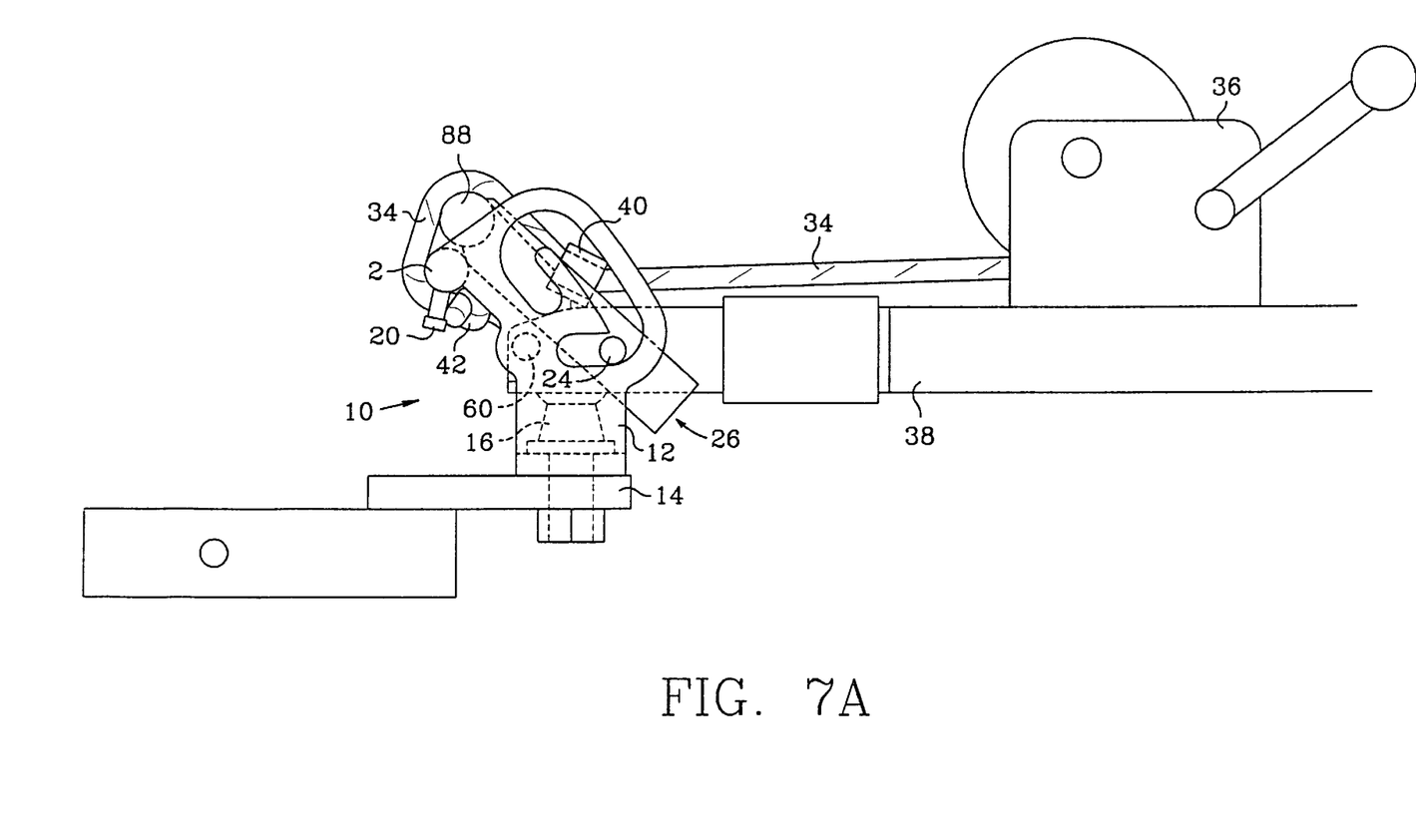
Figure 7B:
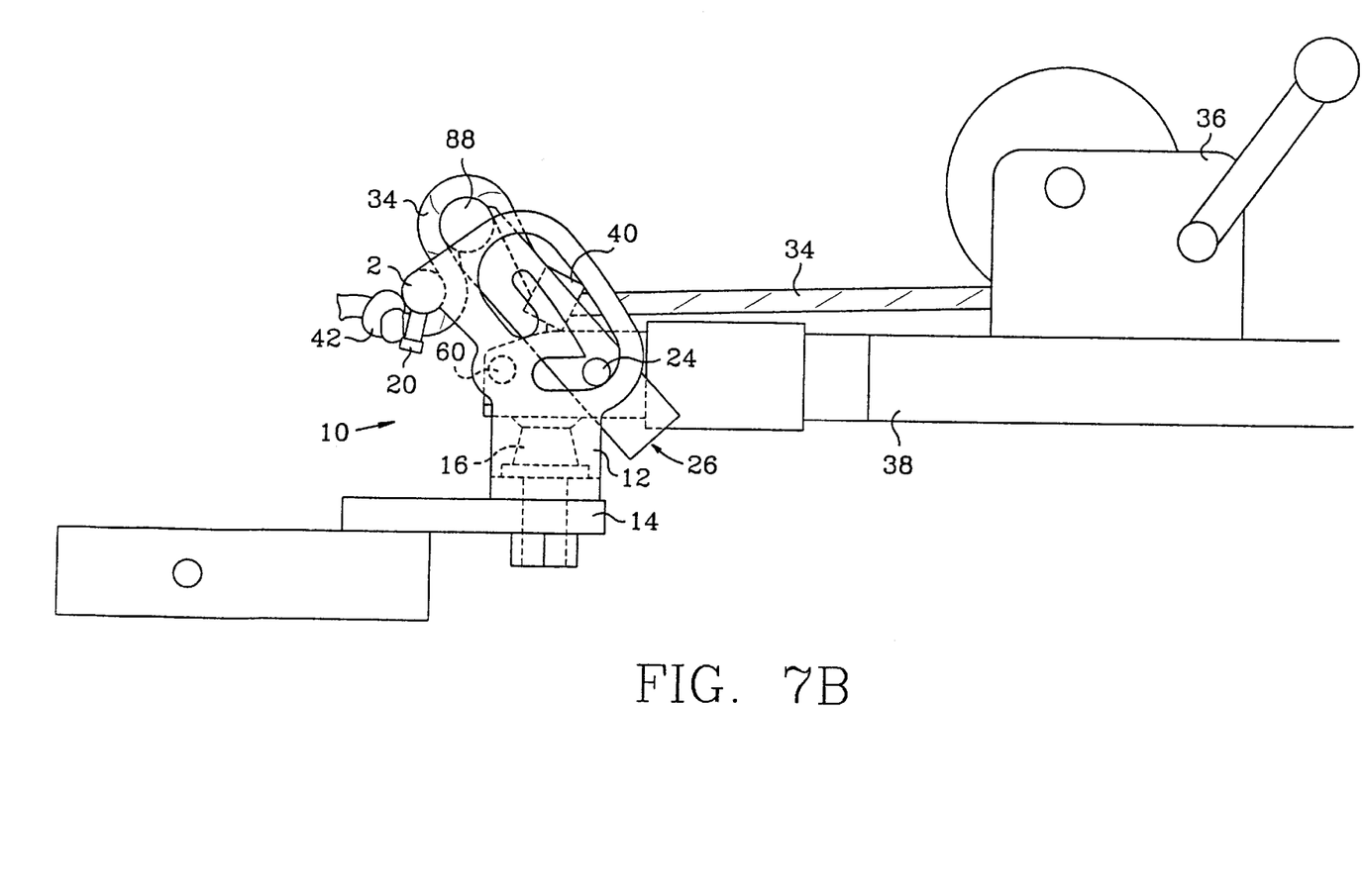

When the slack is taken out of the cable 34 by operation of the winch 36, the tongue 38 and the trailer hitch coupler 44 are pulled up to contact the rear side of pivotal arm 26, as shown in FIG. 5 and then FIG. 6, thereby causing the pivotal arm to be pulled up to a generally vertical position within the swiveling vertical post 12, as in FIG. 7. Here, the trailer hitch coupler 44 is nearly directly above the hitch ball 16, and when some slack is let back into the cable 34, the pivotal arm 26 pivots all the way to the forward position and the trailer hitch coupler 44 settles down on top of the hitch ball 16 for connection therewith, as shown in FIG. 7A—when the vehicle is at a higher elevation than the trailer, and as shown in FIG. 8B—when the trailer is at a higher elevation than the vehicle. Thus, in the loading procedure, the arm preferably swings about 120 degrees.

Figure 8:
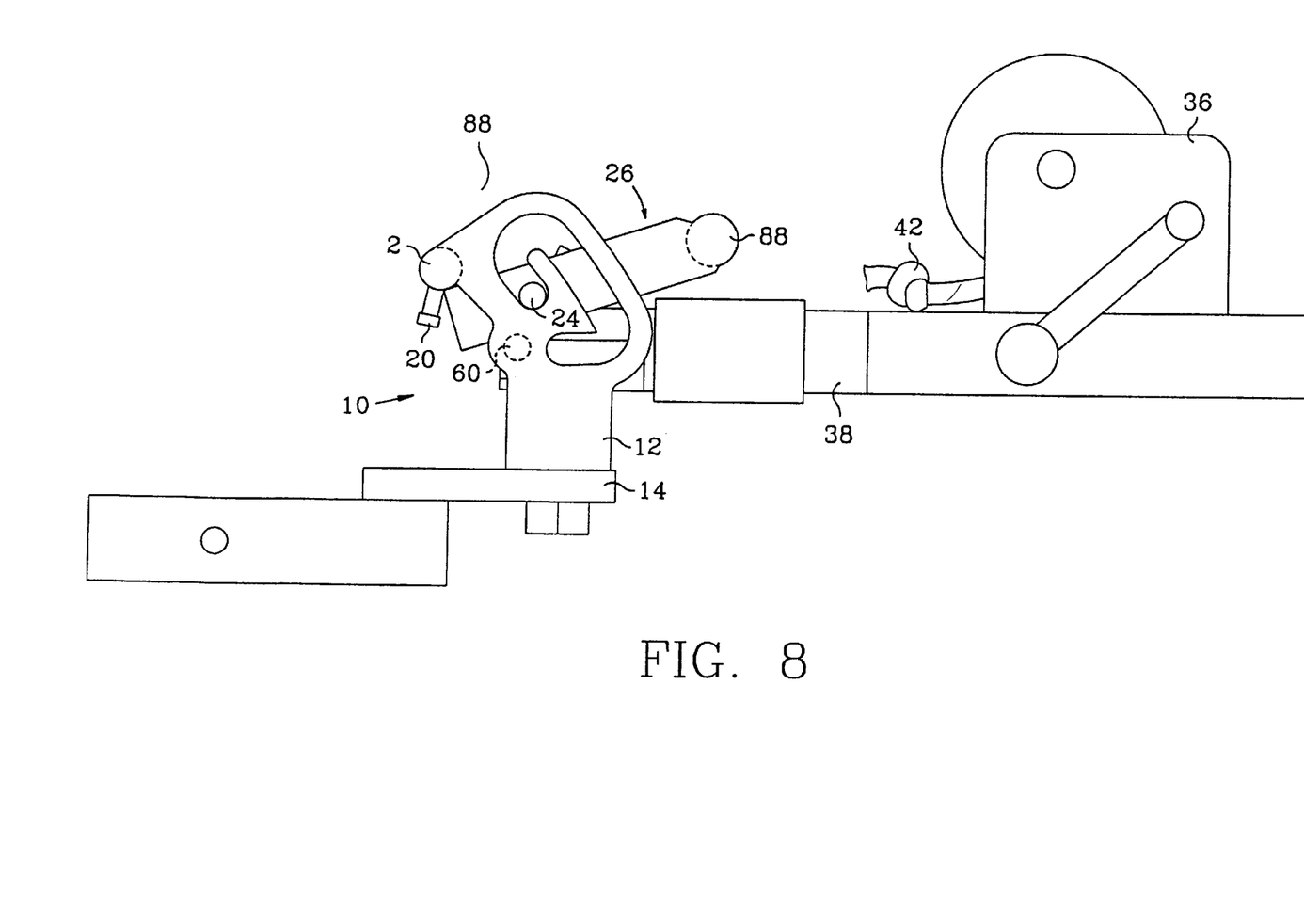
FIG. 8 is a side schematic view of the embodiment of FIG. 1 after the trailer has been coupled to the vehicle.

After the trailer hitch coupler 44 has been connected and secured upon the trailer hitch ball 16, the cable 34 may be left attached to the lower cable receiver 20 while the trailer is being towed by the vehicle, or the cable 34 may be removed from the lower cable receiver 20, and the slack removed from the cable 34, as shown in FIG. 8.

Figure 9A:
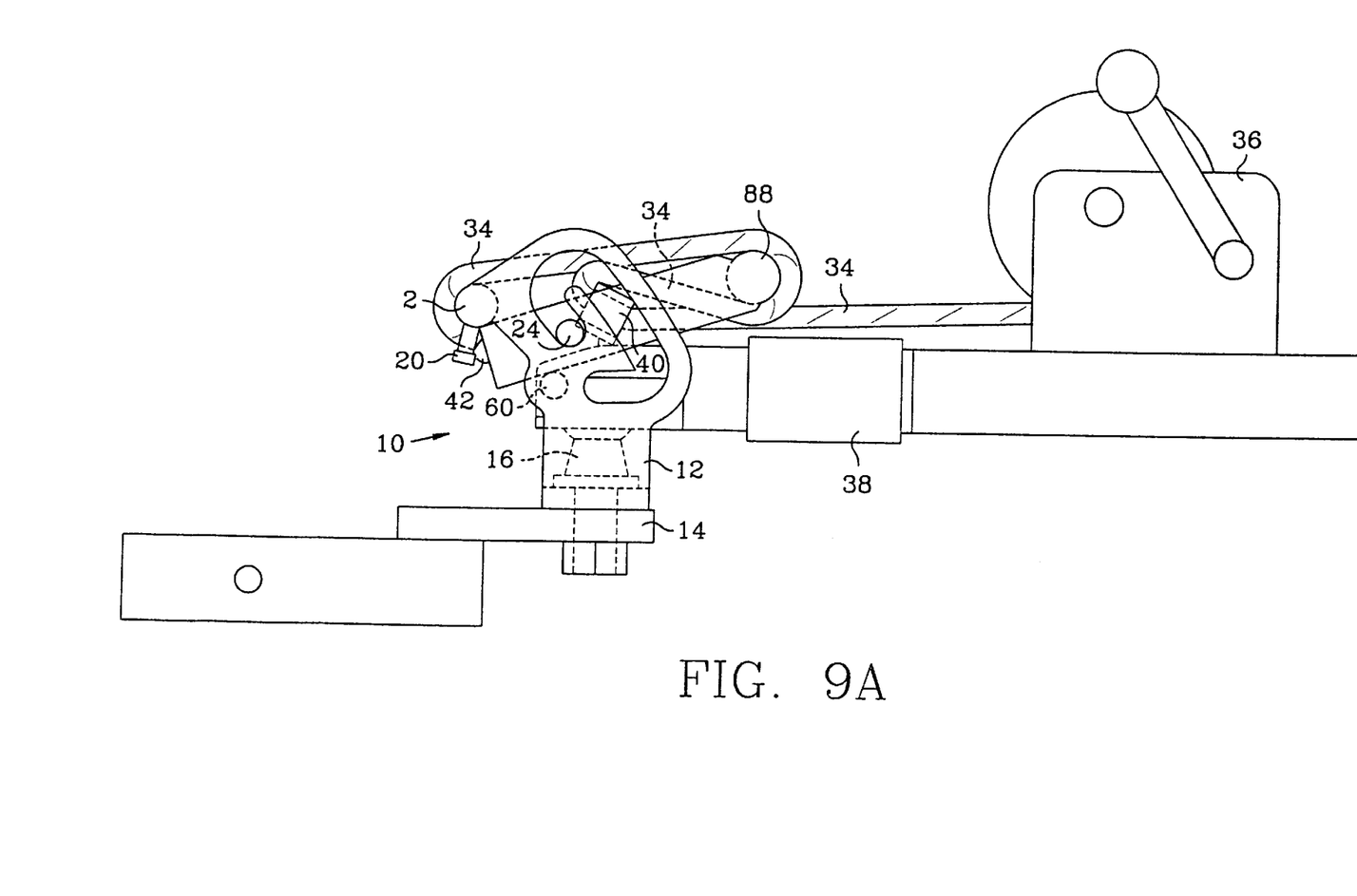
Figure 9B:
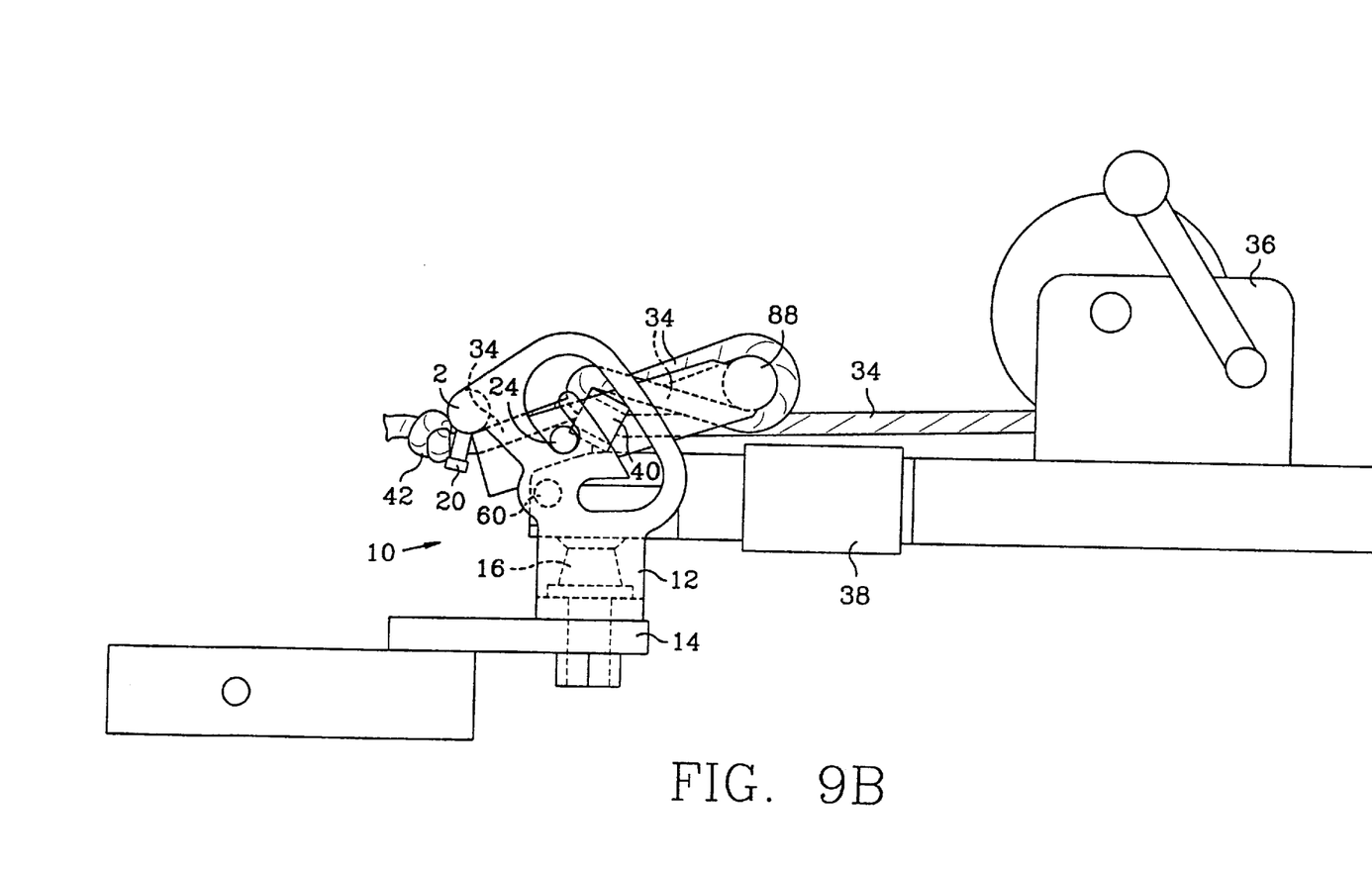
FIG. 9B illustrates the alternative cable position for cases where the trailer is higher than the vehicle.
Figure 10:
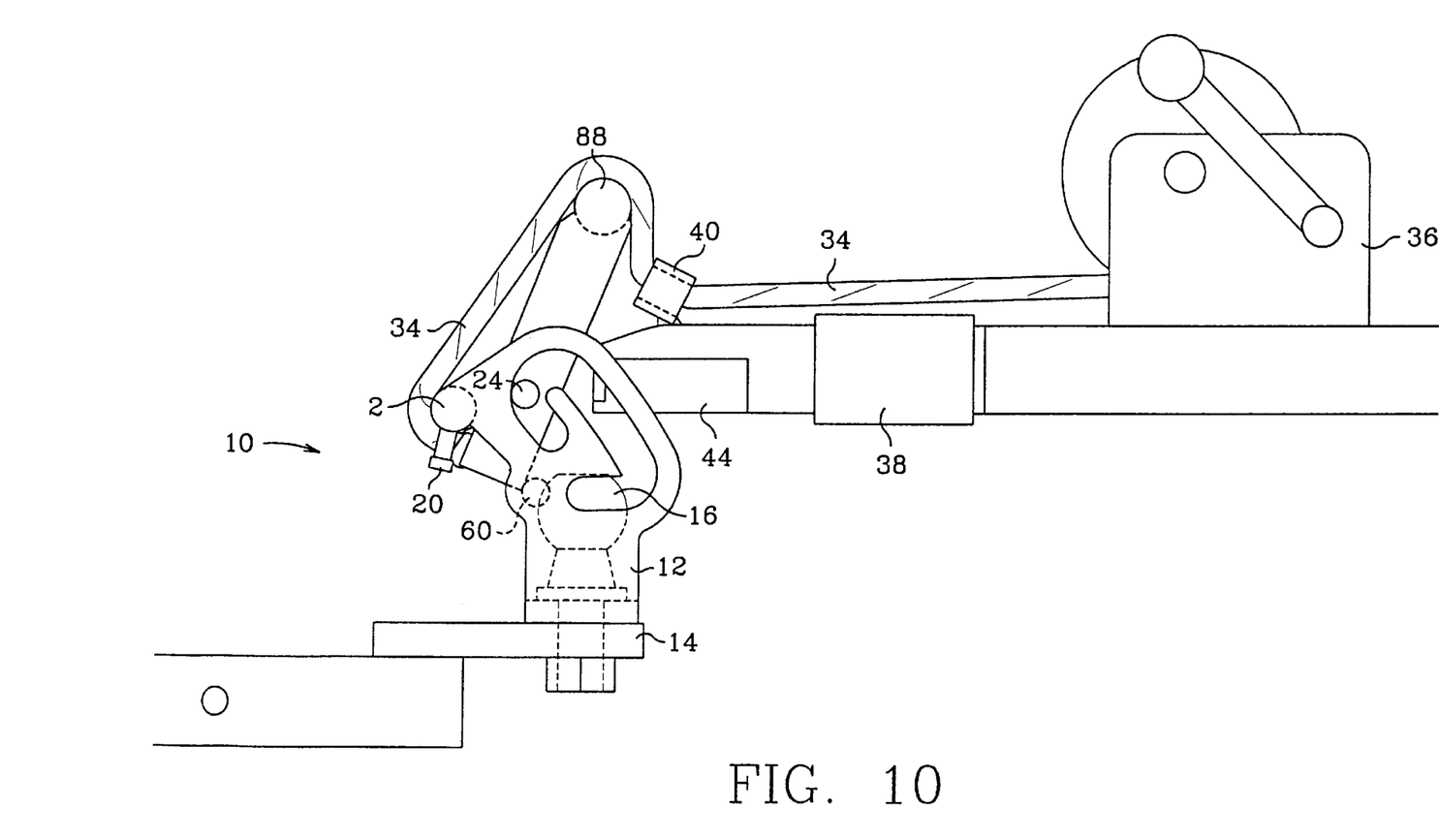
Figure 11:
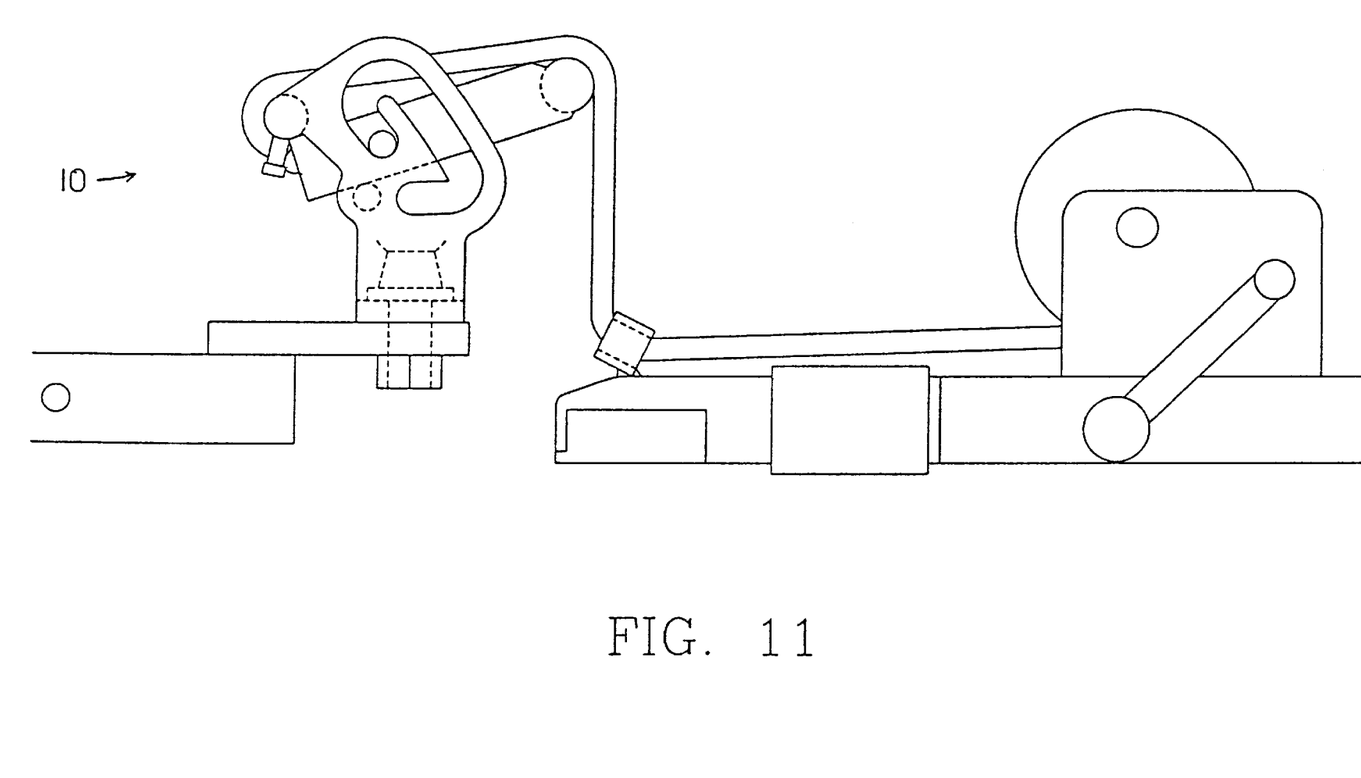

During off-loading, as shown in FIGS. 9A and 9B, the cable 34 passes from the winch 36, and through the tongue cable guide 40. The pivotal arm 26 is then slid into its upper position, with the proximal ends of the arm 26 being moved above stops pins 60. Placing the pivotal arm 26 in its upper position 85 entails maneuvering the pivotal arm 26 so that the pivot bolts 24 are located within the top end 85 of the "C-shaped" channels, that is, the upper forward "hook" portion of the channels 50. The pivotal arm 26 is then rotated into the generally vertical position. When the vehicle is at a higher elevation than the trailer, as shown in FIG. 9A, the cable 34 from tongue cable guide 40 is directed over pivotal arm 26, over the stationary post 2 and is connected to the lower cable receiver 20. When the trailer is at a higher elevation than the vehicle, as shown in FIG. 9B, the cable 34 from the tongue cable guide 40 is directed over the pivotal arm 26, under the stationary post 2 and is connected to the lower cable receiver 20.

This way, when the slack is taken out of the cable 34 by operating the winch 36, the tongue 38 and the trailer hitch coupler 44 are pulled up off the ball 16. The pivotal arm 26, initially starting out in a rearward position, then rotates forwardly about 50 to 70 degrees as the coupler 44 is pulled up off the ball 16. As the coupler 44 is pulled up off the ball, the tongue cable guide 40 is drawn up nearer to the pivotal arm transverse post 88. Then the pivotal arm 26 rotates rearwardly, and the tongue 38 and the trailer hitch coupler 44 settle down behind the hitch ball 16. As the pivotal arm 26 rotates during this step (FIG. 10), the pivotal arm 26 tends to pivot in a position which places the pins 24 nearer to the top curve of the channel 50.

In addition, inventor also envisions a safety cover attached to the pivotal arm 26 and extending towards and covering the stationary arm 2 in a manner that covers the opening between the plates 18 and 18', so as to prevent a user or third person from accidentally getting their fingers or other item "pinched" between the pivotal arm 26 and the stationary arm 2 during the invention's use. Being attached to the pivotal arm 26, this safety cover would rotate as the to pivotal arm 26 rotates from a rearward position to a generally vertical position.

In summary, trailer hitches of the type of the present invention and the embodiments claimed in the inventor's earlier, related application, Ser. No. 08/914,241, filed Aug. 18, 1997, may be said to be comprised of a vertical post near a trailer hitch ball, the vertical post having a pivotal arm which is able to be pivoted from a generally vertical position to a generally rearwardly inclined position, wherein the pivotal arm has at least one pivoting location on the vertical post. Wherein the inventor's earlier application disclosed one pivoting location for the pivotal arm located on the vertical post, the present application discloses two separate and distinct pivoting locations, an upper position and a lower position. This ability to move the pivotal arm from a lower position to a higher position, in the present invention, enhances the invented trailer hitches' performance by allowing for greater leverage and more appropriately placed leverage and ease of use in loading and unloading the trailer from the vehicle.

Alternative designs, besides the C-shaped channel, may be used to provide the upper and lower positions of the present invention. However, the C-shaped channel allows convenient use without disassembly, unbolting, or other complex manipulation. The pivot arm may be simply slid along the channel to the desired position.

Although this invention has been described above with reference to particular means, materials and embodiments, it is to be understood that the invention is not limited to these disclosed particulars, but extends instead to all equivalents within the scope of the following claims.

I claim:

1. A trailer hitch device of the ball and socket type, comprising:
    a vertical post near the ball, the post having a front side and a rear side, distal end above the trailer hitch ball and a channel;
    said vertical post having a pivotal arm which can rotate from a generally vertical position to a rearwardly inclined position;
    wherein said pivotal arm is adapted to be maneuvered from an upper position to a lower position within the channel;
    said vertical post having a first cable guide near its distal end; and,
    said pivotal arm having a distal end and a second cable guide near the distal end.

2. The device of claim 1, wherein said vertical post also comprises a receiver for a cable, said receiver being located near the front surface of the vertical post.

3. The device of claim 2, further comprising a trailer tongue with a socket and a cable guide in close proximity to the socket.

4. The device of claim 3, further comprising a winch connected to the tongue behind said cable guide.

5. The device of claim 1, wherein said vertical post is attached to a ball hitch plate, said vertical post allowed to pivot on a vertical axis relative to the ball hitch plate.

6. The device of claim 1, wherein said vertical post also comprises a stop pin for inhibiting rearward movement of said pivotal arm.

7. The device of claim 1, wherein the channel is generally C-shaped and faces forward.

8. The device of claim 2, wherein the vertical post comprises a horizontal post and the cable receiver comprises a plurality of generally downwardly protruding pins extending form the horizontal post.

9. The device of claim 1, wherein the pivotal arm comprises two spaced parallel plates connected by a transverse post and wherein the transverse post has an outer surface that is the cable guide surface of the pivotal arm.

10. A method for operating a trailer hitch device of the ball and socket type behind a vehicle, comprising:
    lifting the socket relative to the ball by taking slack out of a cable passing through a cable guide in close proximity to the socket and over a cable guide on a pivotal arm connected to a vertical post in close proximity to the ball, wherein the pivotal arm pivots relative to the vertical post at a pivot point;
    wherein the pivotal arm is slidable on the vertical post to a plurality of pivot point positions, said pivot point positions comprising an upper position above and in front of the ball and a lower position near the ball.

* * * * *